United States Patent
Arahama et al.

(10) Patent No.: US 11,377,046 B2
(45) Date of Patent: Jul. 5, 2022

(54) VEHICLE WITH TOILET

(71) Applicant: TOYOTA JIDOSHA KABUSHIKI KAISHA, Toyota (JP)

(72) Inventors: Mitsuharu Arahama, Miyoshi (JP); Masashi Yoshida, Toyota (JP); Misaki Itano, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/325,465

(22) Filed: May 20, 2021

(65) Prior Publication Data
US 2022/0001814 A1 Jan. 6, 2022

(30) Foreign Application Priority Data

Jul. 3, 2020 (JP) .............................. JP2020-115606

(51) Int. Cl.
*B60R 15/04* (2006.01)
(52) U.S. Cl.
CPC ..................................... *B60R 15/04* (2013.01)
(58) Field of Classification Search
CPC ....................................................... B60R 15/04
USPC ............. 4/458, 449; 52/64; 296/23–24, 28 R
See application file for complete search history.

(56) References Cited

U.S. PATENT DOCUMENTS

| | | | | |
|---|---|---|---|---|
| 1,514,157 A | * | 11/1924 | Harding | B60R 15/04 296/156 |
| 3,594,825 A | * | 7/1971 | Reid | B60R 15/00 4/663 |
| 3,807,789 A | * | 4/1974 | Turquin | B60P 3/32 296/168 |
| 4,017,116 A | * | 4/1977 | Hulsey | B60P 3/34 296/156 |
| 4,149,748 A | * | 4/1979 | Tanner | B60S 9/08 296/168 |
| 4,261,613 A | * | 4/1981 | Alford | B60P 3/1016 296/156 |
| 4,653,125 A | * | 3/1987 | Porter | E03D 7/00 4/301 |
| 4,776,631 A | * | 10/1988 | Sargent | E03D 5/01 296/156 |
| 4,785,483 A | * | 11/1988 | Wise | A47K 11/04 296/65.07 |

(Continued)

FOREIGN PATENT DOCUMENTS

JP 2002240633 A 8/2002

*Primary Examiner* — Lori L Baker
(74) *Attorney, Agent, or Firm* — Dickinson Wright PLLC

(57) ABSTRACT

To achieve both a reduction in weight of a toilet room and an improvement in strength thereof. A vehicle with a toilet includes a toilet room including a side-surface part and a ceiling part connected to the side-surface part. The side-surface part includes a plate-like side-surface outer plate extending in a vertical direction, and an upper-end edge frame extending in a longitudinal direction and connected to an inner-side upper-end edge of the side-surface outer plate. The ceiling part includes a plate-like ceiling outer plate extending in a horizontal direction, and a side-end edge frame extending in the longitudinal direction and connected to an inner-side side-end edge of the ceiling outer plate. The upper-end edge frame of the side-surface part and the side-end edge frame of the ceiling part are connected to each other by at least one rod-like reinforcing member.

5 Claims, 4 Drawing Sheets

(56) References Cited

U.S. PATENT DOCUMENTS

| | | | | |
|---|---|---|---|---|
| 5,031,249 A * | 7/1991 | Sargent | ............... | B60R 15/04 |
| | | | | 4/321 |
| 5,556,498 A * | 9/1996 | Blanchard | ............ | B29C 65/00 |
| | | | | 156/245 |
| 6,782,561 B2 * | 8/2004 | Sigler | ............... | B60R 15/04 |
| | | | | 4/300 |
| 7,313,833 B2 * | 1/2008 | Wee | ............... | B60R 15/04 |
| | | | | 4/458 |
| 7,806,463 B2 * | 10/2010 | Oliver | ............... | B60P 3/36 |
| | | | | 296/168 |
| 8,286,391 B2 * | 10/2012 | Yang | ............... | E04B 1/3444 |
| | | | | 52/69 |
| 10,549,675 B2 * | 2/2020 | Devine | ............... | E04H 1/02 |
| 2008/0258497 A1 * | 10/2008 | Oliver | ............... | B60R 15/00 |
| | | | | 296/168 |
| 2009/0214291 A1 * | 8/2009 | Farr | ............... | E01D 1/00 |
| | | | | 404/1 |
| 2011/0247132 A1 * | 10/2011 | Watts | ............... | B60R 15/04 |
| | | | | 4/458 |
| 2016/0029858 A1 * | 2/2016 | Taylor | ............... | B60N 2/26 |
| | | | | 4/458 |
| 2020/0317111 A1 * | 10/2020 | Mundt | ............... | B60P 3/39 |

* cited by examiner

VEHICLE WITH TOILET

CROSS REFERENCE TO RELATED APPLICATIONS

This application is based upon and claims the benefit of priority from Japanese patent application No. 2020-115606, filed on Jul. 3, 2020, the disclosure of which is incorporated herein in its entirety by reference.

BACKGROUND

The present disclosure relates to a vehicle with a toilet, i.e., a vehicle equipped with a toilet room.

A vehicle with a toilet, i.e., a truck with a toilet room installed on its bed has been known (e.g., see Japanese Unexamined Patent Application Publication No. 2002-240633).

SUMMARY

Since heavy objects such as a ceramic toilet seat are disposed inside the toilet room, the toilet room itself needs to have a strength (i.e., needs to be robust). Meanwhile, although a vehicle is required to reduce its weight to keep the weight limit for the vehicle itself, it is difficult to reduce the weight of the aforementioned heavy objects such as the ceramic toilet seat. Therefore, it is necessary to improve the strength of the toilet room itself and to reduce the weight of the toilet room itself at the same time.

The present disclosure has been made to solve the above-described problem and an object thereof is to provide a vehicle with a toilet capable of achieving both a reduction in weight of a toilet room and an improvement in strength thereof at the same time.

To achieve the above-described object, a first exemplary aspect is a vehicle with a toilet including a toilet room including a side-surface part and a ceiling part connected to the side-surface part, in which the side-surface part includes a plate-like side-surface outer plate extending in a vertical direction, and an upper-end edge frame extending in a longitudinal direction and connected to an inner-side upper-end edge of the side-surface outer plate, the ceiling part includes a plate-like ceiling outer plate extending in a horizontal direction, and a side-end edge frame extending in the longitudinal direction and connected to an inner-side side-end edge of the ceiling outer plate, and the upper-end edge frame of the side-surface part and the side-end edge frame of the ceiling part are connected to each other by at least one rod-like reinforcing member.

In this aspect, at least one of the side-surface outer plate and the upper-end edge frame of the side-surface part, the ceiling outer plate and the side-end edge frame of the ceiling part, and the reinforcing member may be formed of aluminum or a carbon fiber reinforced plastic.

In this aspect, the ceiling part may further include a lateral frame extending in a lateral direction, connected to an inner side of the ceiling outer plate, and connecting a side-end edge frame on a left side of the ceiling part to a side-end edge frame on a right side thereof; the side-surface part may further include a vertical frame extending from a lower end of the side-surface outer plate to the upper-end edge frame in the vertical direction, an upper end of the vertical frame being connected to the upper-end edge frame; and the reinforcing member may connect a connection part between the side-end edge frame and the lateral frame to a connection part between the upper-end edge frame and the vertical frame.

In this aspect, the at least one reinforcing member may include: a first reinforcing member connecting a front side of the upper-end edge frame of the side-surface part to a front side of the side-end edge frame of the ceiling part; a second reinforcing member connecting a central part of the upper-end edge frame of the side-surface part to a central part of the side-end edge frame of the ceiling part; and a third reinforcing member connecting a rear side of the upper-end edge frame of the side-surface part to a rear side of the side-end edge frame of the ceiling part.

In this aspect, an upper-end edge of the side-surface outer plate of the side-surface part and a side-end edge of the ceiling outer plate of the ceiling part may be connected to each other by a curved-surface outer plate having a curved surface.

According to the present disclosure, it is possible to provide a vehicle with a toilet capable of achieving both a reduction in weight of a toilet room and an improvement in strength thereof at the same time.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
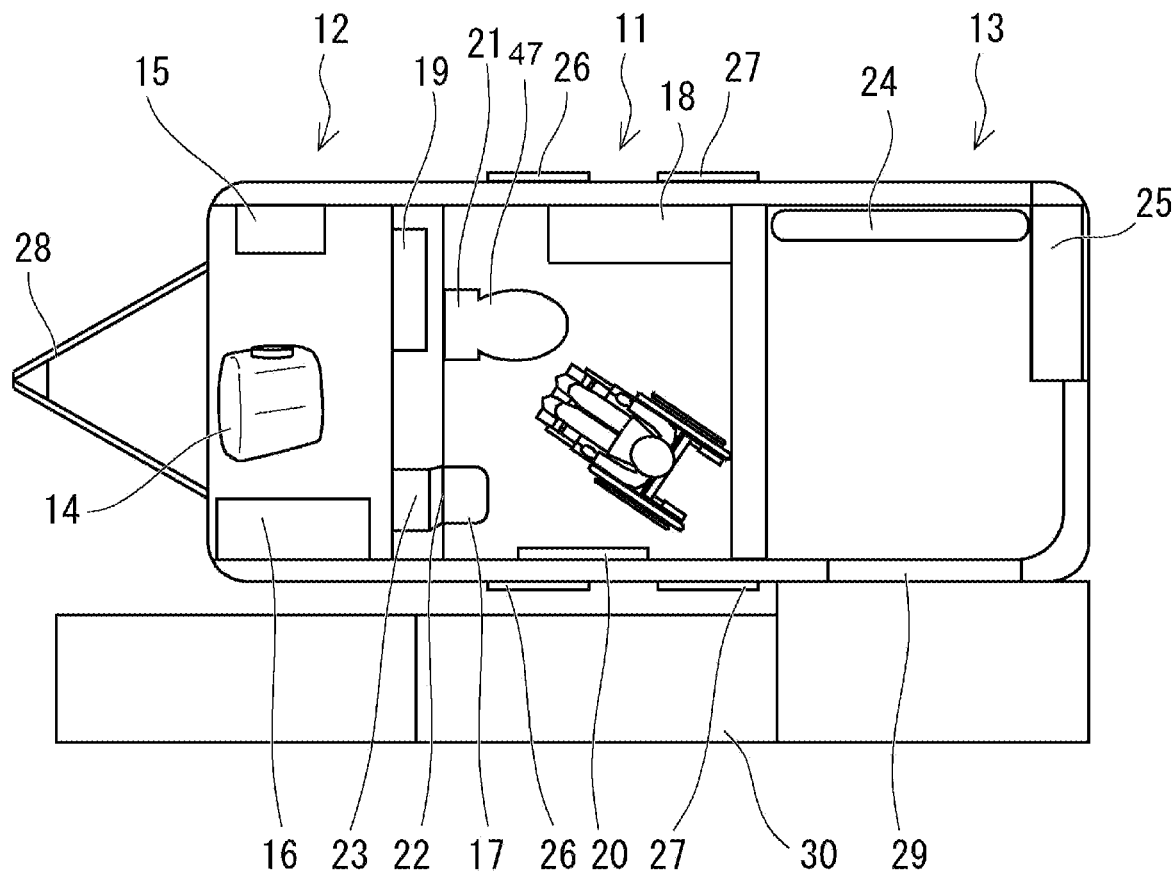
FIG. 1 is a plan view of a vehicle with a toilet according to an embodiment.
Figure 1:
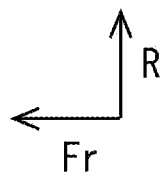

Embodiments according to the present disclosure will be described hereinafter with reference to the drawings. FIG. 1 is a plan view of a vehicle with a toilet according to an embodiment. Direction axes Fr and R are labeled in FIG. 1. A vehicle 1 with a toilet according to this embodiment includes at least a toilet room 11 inside thereof. The vehicle 1 with the toilet includes, for example, the toilet room 11, a facility room 12 disposed adjacent to and in front of the toilet room 11, and a front room 13 disposed adjacent to and behind the toilet room 11.

In the facility room 12, a toilet tank 14, a water-supply pump 15, and a first storage battery 16, and the like are provided. The water-supply pump 15 is disposed in the front-right part of the facility room 12. The water-supply pump 15 supplies water to a shower Toilet® (Registered Trademark) 47, an ostomate-sink 17 for an ostomate, a washbasin 18, and the like in the toilet room 11.

The toilet tank 14 is disposed adjacent to the water-supply pump 15 and in front of the facility room 12. The first storage battery 16 is disposed on the side surface on the left side of the facility room 12 and supplies electric power to on-vehicle apparatuses. The first storage battery 16 is formed as, for example, a secondary battery capable of being charged and discharged, such as a lithium battery and a nickel-hydrogen battery.

In the toilet room 11, the shower toilet 47, the ostomate-sink 17 for an ostomate, the washbasin 18, an air compressor 19 that performs air-conditioning for the inside of the toilet room 11, a monitor 20, and the like are provided.

The shower toilet 47 is disposed in the front-right part of the toilet room 11. The shower toilet 47 is provided with a toilet drain pump 21 that drains water from the toilet seat.

The sink 17 is disposed in the front-left part of the toilet room 11. The sink 17 is provided with an ostomate-sink drain pump 22 that drains water from the ostomate-sink 17 and an electric water heater 23. The washbasin 18 is disposed on the side surface on the rear-right part of the toilet room 11.

In the front room 13, a storable-type bed (i.e., folding-type bed) 24, a second storage battery 25, and the like are provided. The storable-type bed 24 is disposed on the side surface on the right side of the front room 13. In a stored state (i.e., in a folded state), the storable-type bed 24 is vertically positioned parallel to the side surface on the right side of the front room 13. Further, in a used state, the storable-type bed 24 is pulled down so that it becomes parallel to the floor surface of the front room 13. The second storage battery 25 is disposed on the side surface on the rear-right part of the front room 13 and supplies electric power to the on-vehicle apparatuses. The second storage battery 25 is formed as a secondary battery capable of being charged and discharged, such as a lithium battery and a nickel-hydrogen battery.

A pair of left and right front wheels 26 and a pair of left and right rear wheels 27 are provided side by side in the longitudinal direction near the center of the lower part of the vehicle 1 with the toilet. The vehicle 1 with the toilet is formed as a towed vehicle. A towed part 28 formed by a roughly V-shaped frame is provided in the front end of the vehicle 1 with the toilet. A towed part 28 of another vehicle equipped with a driving unit such as an engine or a motor is connected to the towed part 28 of the vehicle 1 with the toilet. In this way, the vehicle 1 with the toilet can be towed and moved by the other vehicle. Note that the vehicle 1 with the toilet may be formed as a self-propelled vehicle equipped with a driving unit.

A doorway 29 through which a user enters the front room 13 of the vehicle or exit from the front room 13 is provided on the side surface on the left side of the rear part of the front room 13. The front room 13 and the toilet room 11 may be partitioned by a sliding door or the like. The user enters the front room 13 from the doorway 29, enters the toilet room 11 from the front room 13, and uses the toilet.

The doorway 29 of the vehicle is configured so that a slope (i.e., a ramp) 30 can be attached thereto in a detachable manner. The slope 30 extends in the longitudinal direction of the vehicle on the side of the vehicle. Therefore, it is possible to secure at least a certain length of the slope 30 and thereby reduce the inclination angle of the slope 30. Further, it requires only a space equivalent to the width of the slope on the side of the vehicle, and hence does not require a large space.

Figure 2:
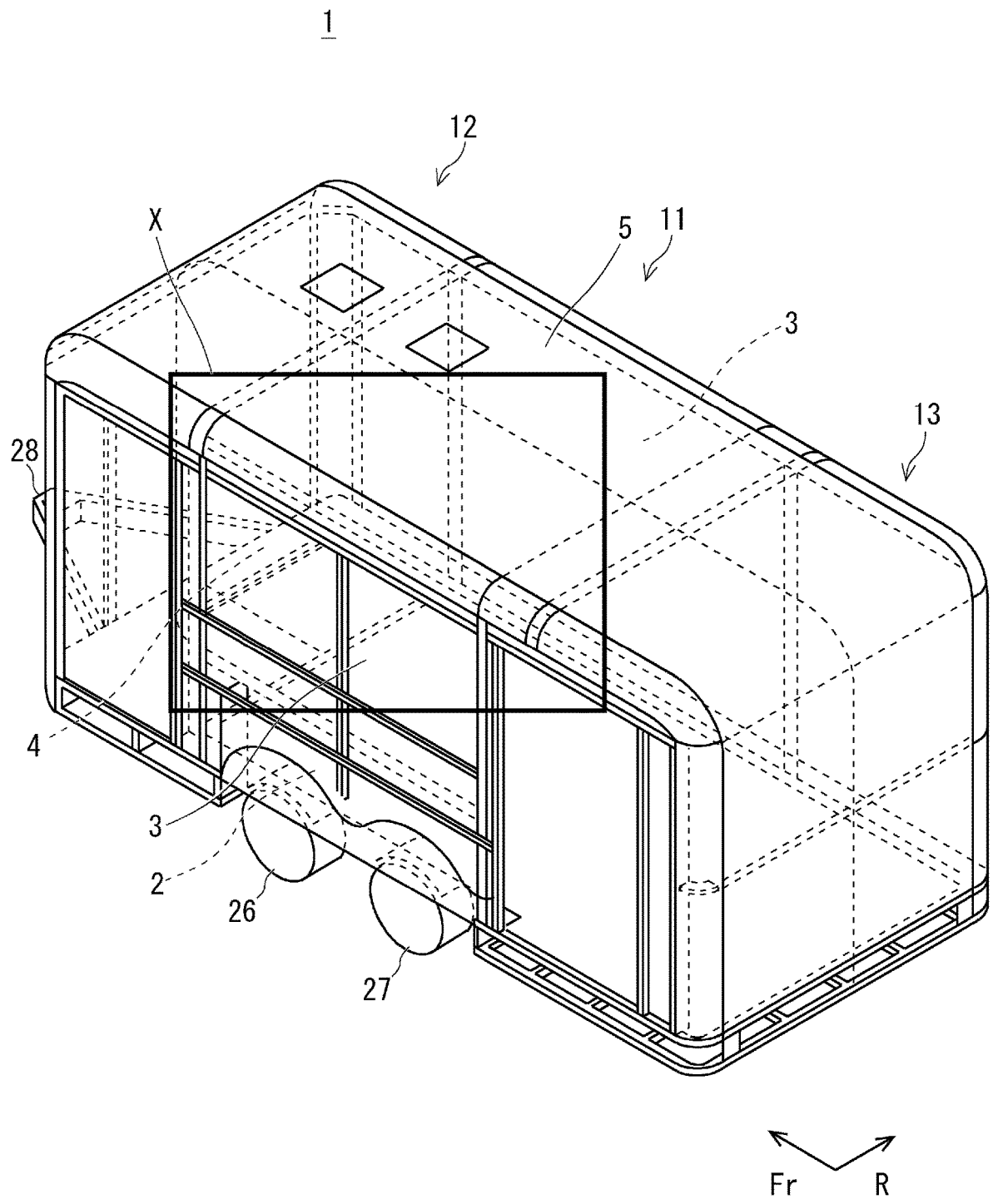
FIG. 2 is a perspective view showing a configuration of a toilet room.

Next, the configuration of the toilet room will be described in detail. FIG. 2 is a perspective view showing the configuration of the toilet room. As shown in FIG. 2, the toilet room 11 is formed as a box-shaped room including a floor surface 2, a pair of opposed left and right side-surface parts 3, a partition part 4, and a ceiling part 5.

The lower ends of the side-surface parts 3 are connected to the floor surface 2, and the upper ends of the side-surface parts 3 are connected to the ceiling part 5. The partition part 4 is a wall surface that partitions the facility room 12 from the toilet room 11. The lower end of the partition part 4 is connected to the floor surface 2, and the upper end of the partition part 4 is connected to the ceiling part 5. Further, the side ends (i.e., the lateral end) of the partition part 4 are connected to the side-surface parts 3. Note that the partition part 4 may be a sliding door or the like.

The front end of the ceiling part 5 is connected to the upper end of the partition part 4, and the side ends of the ceiling part 5 are connected to the upper ends of the side-surface parts 3. The ceiling part 5 is supported by the partition part 4 and the pair of side-surface parts 3.

Figure 3:
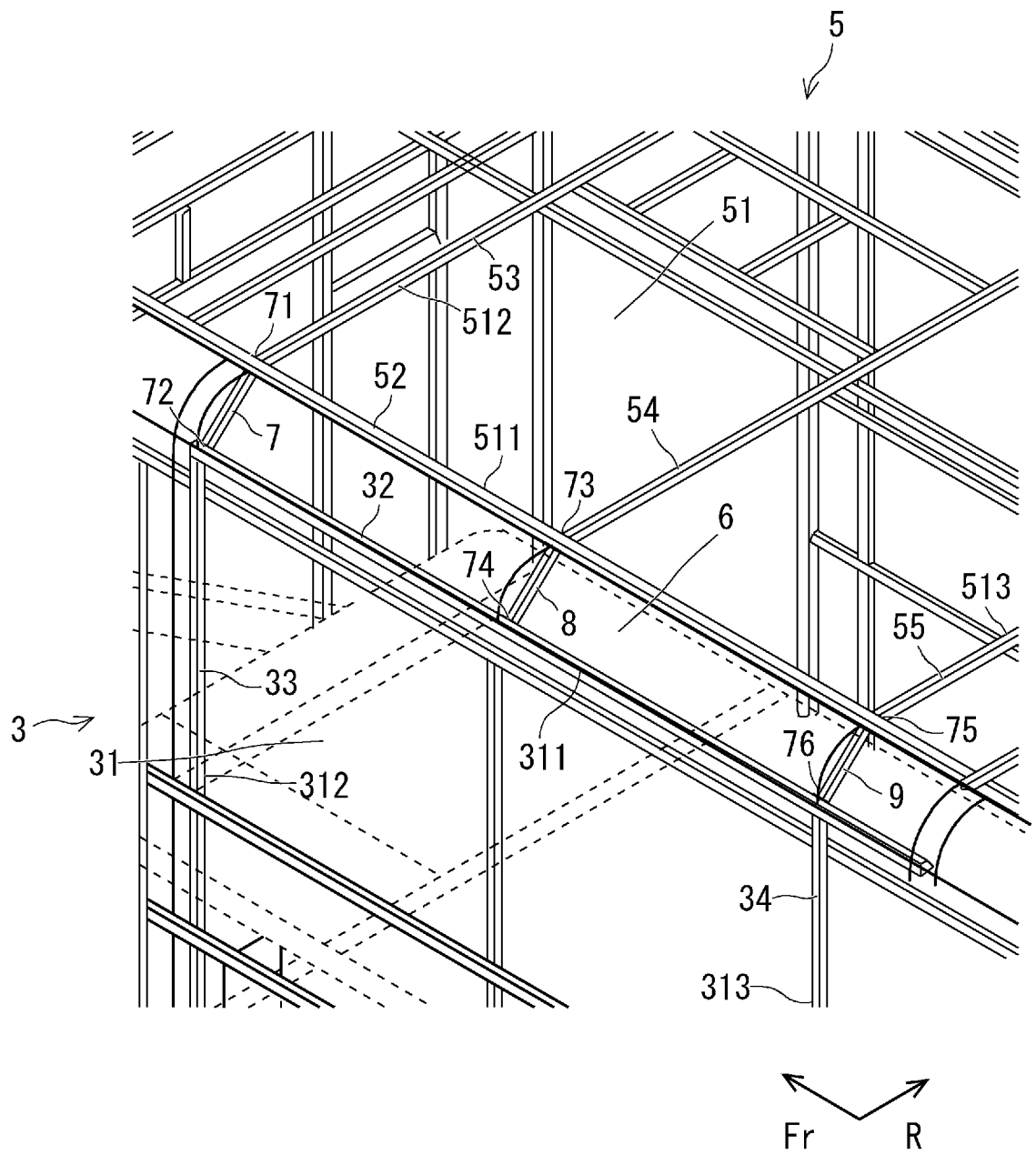
FIG. 3 is an enlarged view of a part X of the toilet room shown in FIG. 2.

FIG. 3 is an enlarged view of a part X of the toilet room shown in FIG. 2. Note that FIG. 3 mainly shows the side-surface part 3 and the ceiling part 5 on the left side of the vehicle, and the side-surface part 3 and the ceiling part 5 on the right side of the vehicle have structures similar to those on the left side of the vehicle.

The side-surface part 3 includes a plate-like side-surface outer plate 31, an upper-end edge frame 32 connected to the inner-side surface of the side-surface outer plate 31, and front and rear vertical frames 33 and 34 connected to the inner-side surface of the side-surface outer plate 31. The side-surface outer plate 31 is reinforced by the upper-end edge frame 32 and the vertical frames 33 and 34.

The side-surface outer plate 31 is a roughly rectangular plate-like member extending in the vertical direction. The side-surface outer plate 31 of the toilet room 11 may be integrally formed as one plate with the side-surface outer plate of the facility room 12 and the side-surface outer plate of the front room 13.

The upper-end edge frame 32 is formed as a rod-like tubular member extending in the longitudinal direction and connected to the upper-end edge 311 of the side-surface outer plate 31. By forming the upper-end edge frame 32 as a hollow tubular member, the weight of the upper-end edge frame 32 can be reduced and hence the weight of the toilet room 11 can be reduced even further. The upper-end edge frame 32 may extend along the upper-end edge 311 of the side-surface outer plate 31 and extend to the front and rear ends of the vehicle.

The vertical frame 33 on the front side of the side-surface part 3 is formed as a rod-like tubular member extending from the lower end of the side-surface outer plate 31 to the upper-end edge frame 32 in the vertical direction. The vertical frame 33 on the front side is connected to the front side-end edge 312 of the side-surface outer plate 31. The upper end of the vertical frame 33 on the front side is connected to the upper-end edge frame 32.

The vertical frame 34 on the rear side of the side-surface part 3 extends in parallel to the vertical frame 33 on the front side. The vertical frame 34 on the rear side is formed as a rod-like tubular member extending from the lower end of the side-surface outer plate 31 to the upper-end edge frame 32 in the vertical direction. By forming the front and rear vertical frames 33 and 34 as hollow tubular members, the weight of the front and rear vertical frames 33 and 34 can be reduced and hence the weight of the toilet room 11 can be reduced even further. The vertical frame 34 on the rear side is connected to the rear side-end edge 313 of the side-surface outer plate 31. The upper end of the vertical frame 34 on the rear side is connected to the rear side of the upper-end edge frame 32.

Figure 4:
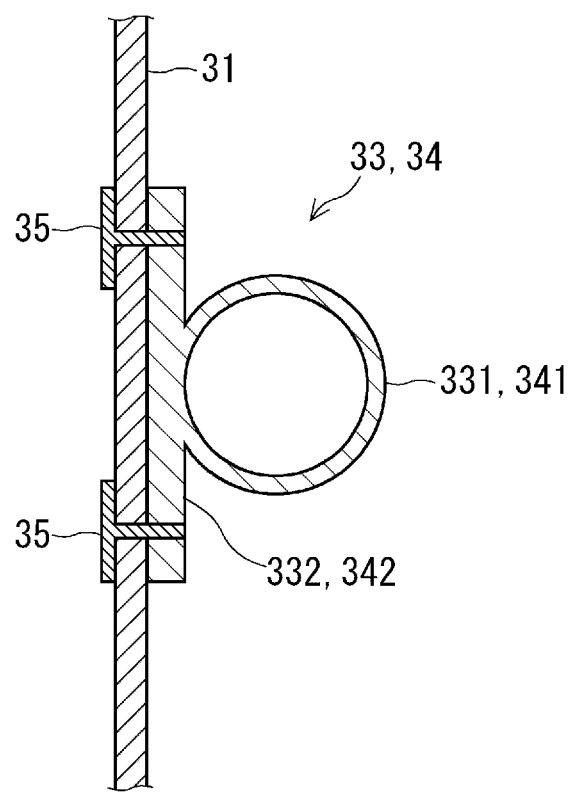
FIG. 4 is a cross-sectional diagram showing an example of a method for connecting a side-surface outer plate to a vertical frame.

FIG. 4 is a cross-sectional diagram showing an example of a method for connecting the side-surface outer plate to the vertical frame on the front side or the rear side. For example, each of the front and rear vertical frames 33 and 34 is formed by a rod-like pipe part 331 or 341 and a plate-like attaching part 332 or 342 integrally formed with the pipe part 331 or 341. Note that although the pipe part 331 or 341 has a roughly circular shape on the cross section in FIG. 4, its shape is not limited to the circular shape. For example, the pipe part may have a polygonal shape such as a rectangular shape or a square shape.

The attaching part 332 or 342 of each of the front and rear vertical frames 33 and 34 is fastened to the side-surface outer plate 31 by fastening rivets 35 or the like. Note that the side-surface outer plate 31 and the upper-end edge frame 32 may be connected to each other by a connecting method similar to the above-described method for connecting the side-surface outer plate 31 to the vertical frames 33 and 34.

As shown in FIG. 3, the ceiling part 5 includes a plate-like ceiling outer plate 51, a side-end edge frame 52 connected to the inner surface of the ceiling outer plate 51, and front, central, and rear lateral frames 53, 54, and 55 connected to the inner-side surface of the ceiling outer plate 51. The ceiling outer plate 51 is reinforced by the side-end edge frame 52 and front, central, and rear side lateral frames 53, 54, and 55.

The ceiling outer plate 51 is a roughly rectangular plate-like member extending in the horizontal direction. The ceiling outer plate 51 of the toilet room 11 may be integrally formed as one plate with the ceiling outer plate of the facility room 12 and the ceiling outer plate of the front room 13. The side-end edge frame 52 is formed as a rod-like tubular member extending in the longitudinal direction and connected to the side-end edge 511 of the ceiling outer plate 51. By forming the side-end edge frame 52 as a hollow tubular member, the weight of the side-end edge frame 52 can be reduced and hence the weight of the toilet room 11 can be reduced even further. The side-end edge frame 52 may extend along the side-end edge 511 of the ceiling outer plate 51 and extend to the front and rear ends of the vehicle.

The front, central, and rear lateral frames 53, 54, and 55 extend parallel to each other in the lateral direction. The lateral frame 53 on the front side is formed as a rod-like tubular member connected to the front-end edge 512 of the ceiling outer plate 51. The lateral frame 53 on the front side connects the front side of the side-end edge frame 52 on the left side to the front side of the side-end edge frame 52 on the right side.

The lateral frame 54 at the center is formed as a rod-like tubular member connected to the center of the ceiling outer plate 51. The lateral frame 54 at the center connects the center of the side-end edge frame 52 on the left side to the center of the side-end edge frame 52 on the right side. The lateral frame 55 on the rear side is formed as a rod-like tubular member connected to the rear-end edge 513 of the ceiling outer plate 51.

By forming the front, central, and rear lateral frames 53, 54, and 55 as hollow tubular members, the weight of the front, central, and rear lateral frames 53, 54, and 55 can be reduced and hence the weight of the toilet room 11 can be reduced even further. The lateral frame 55 on the rear side connects the rear side of the side-end edge frame 52 on the left side to the rear side of the side-end edge frame 52 on the right side.

Note that only one or two of the front side, center, and rear side lateral frames 53, 54, and 55 may be provided in the ceiling outer plate 51. The ceiling outer plate 51 may be connected to the side-end edge frame 52 and to the lateral frames 53, 54, 55 by a connecting method similar to the above-described method for connecting the side-surface outer plate 31 to the vertical frames 33 and 34.

The upper-end edge frame 32 is connected to the upper-end edge 311 of the side-surface outer plate 31 of the side-surface part 3. The side-end edge frame 52 is connected to the side-end edge 511 of the ceiling outer plate 51 of the ceiling part 5. Further, the upper-end edge frame 32 of the side-surface part 3 and the side-end edge frame 52 of the ceiling part 5 extend in parallel to each other.

The upper-end edge 311 of the side-surface outer plate 31 of the side-surface part 3 and the side-end edge 511 of the ceiling outer plate 51 of the ceiling part 5 are connected to each other by a curved-surface outer plate 6 having a curved face. The curved-surface outer plate 6 complements (i.e., bridges) the space between the upper-end edge 311 of the side-surface outer plate 31 and the side-end edge 511 of the ceiling outer plate 51 of the ceiling part 5 by the curved surface. This curved surface of the curved-surface outer plate 6 makes the corners of the vehicle roundish and thereby improves the design of the vehicle 1 with the toilet.

The side-surface outer plate 31 of the side-surface part 3, the ceiling outer plate 51 of the ceiling part 5, and the curved-surface outer plate 6 may be integrally formed as one plate, or may be formed as separate components and connected to one another.

It should be noted that since heavy objects such as the shower toilet, the ostomate-sink, and the washbasin are disposed inside the toilet room as described above, the toilet room itself needs to have a strength (i.e., needs to be robust). Meanwhile, although a vehicle is required to reduce its weight to keep the weight limit for the vehicle itself, it is difficult to reduce the weight of the aforementioned heavy objects such as the shower toilet. Therefore, it is necessary to improve the strength of the toilet room itself and to reduce the weight of the toilet room itself.

To that end, in this embodiment, the upper-end edge frame 32 of the side-surface part 3 and the side-end edge frame 52 of the ceiling part 5 are connected to each other by rod-like first to third reinforcing members 7, 8, and 9. By connecting the upper-end edge frame 32 to the side-end edge frame 52 and integrally forming the side-surface part 3 and the ceiling part 5, their rigidity is improved and hence the strength of the toilet room 11 can be improved. Further, by forming the first to third reinforcing members 7, 8, and 9 by using only the rod-like members, their weight can be reduced. That is, it is possible to achieve both the reduction in weight of the toilet room 11 and the improvement in strength thereof at the same time.

The side-surface outer plate 31, the upper-end edge frame 32, and the vertical frames 33 and 34 of the side-surface part 3, the ceiling outer plate 51, the side-end edge frame 52, and the lateral frames 53, 54 and 55 of the ceiling part 5, and the first to third reinforcing members 7, 8, and 9 are preferably formed of aluminum or a carbon fiber reinforced plastic (Carbon Fiber Reinforced Plastic or the like). As a result, it is possible to reduce the weight of the toilet room 11 even further, and thereby to achieve both the reduction in weight of the toilet room 11 and the improvement in strength thereof more efficiently.

Note that when the side-surface outer plate 31, the upper-end edge frame 32, and the vertical frames 33 and 34 of the side-surface part 3, the ceiling outer plate 51, the side-end edge frame 52, and the lateral frames 53, 54 and 55 of the ceiling part 5, and the first to third reinforcing members 7, 8, and 9 are formed of aluminum, they are processed more easily and hence the manufacturing cost can be further reduced.

On the other hand, when the side-surface outer plate 31, the upper-end edge frame 32, and the vertical frames 33 and 34 of the side-surface part 3, the ceiling outer plate 51, the side-end edge frame 52, and the lateral frames 53, 54 and 55 of the ceiling part 5, and the first to third reinforcing members 7, 8, and 9 are formed of a carbon fiber reinforced plastic, the strength of the toilet room 11 can be further improved, though they cannot be easily processed and hence the manufacturing cost may increase.

At least one of the side-surface outer plate 31, the upper-end edge frame 32, and the vertical frames 33 and 34 of the side-surface part 3, the ceiling outer plate 51, the side-end edge frame 52, and the lateral frames 53, 54 and 55 of the ceiling part 5, and the first to third reinforcing members 7, 8, and 9 may be formed of aluminum or a carbon fiber reinforced plastic. Alternatively, the side-surface outer plate 31, the upper-end edge frame 32, and the vertical frames 33 and 34 of the side-surface part 3, the ceiling outer plate 51, the side-end edge frame 52, and the lateral frames 53, 54 and 55 of the ceiling part 5, and the first to third reinforcing members 7, 8, and 9 may be formed of a combination of aluminum and a carbon fiber reinforced plastic. (For example, some of them may be formed of aluminum and others of them may be formed of a carbon fiber reinforced plastic.)

The first to third reinforcing members 7, 8, and 9 extend in parallel to each other in an oblique direction. The first to third reinforcing members 7, 8, and 9 are formed as rod-like tubular members that connect the upper-end edge frame 32 of the side-surface part 3 to the side-end edge frame 52 of the ceiling part 5. By forming the first to third reinforcing members 7, 8, and 9 as hollow tubular members, the weight of the first to third reinforcing members 7, 8, and 9 can be reduced and hence the weight of the toilet room 11 can be reduced even further.

The first reinforcing member 7 connects the front side of the upper-end edge frame 32 of the side-surface part 3 to the front side of the side-end edge frame 52 of the ceiling part 5. The second reinforcing member 8 connects the central part of the upper-end edge frame 32 of the side-surface part 3 to the central part of the side-end edge frame 52 of the ceiling part 5. The third reinforcing member 9 connects the rear side of the upper-end edge frame 32 of the side-surface part 3 to the rear side of the side-end edge frame 52 of the ceiling part 5. By arranging the first to third reinforcing members 7, 8, and 9 in a balanced manner as describe above, it is possible to further improve the rigidity of the toilet room 11 and to reduce the weight of the toilet room at the same time.

The first reinforcing member 7 may connect a connection part 71 between the front side of the side-end edge frame 52 of the ceiling part 5 and the end part of the front lateral frame 53 to a connection part 72 between the front side of the upper-end edge frame 32 of the side-surface part 3 and the upper end of the front vertical frame 33. The second reinforcing member 8 may connect a connection part 73 between the central part of the side-end edge frame 52 of the ceiling part 5 and the end part of the central lateral frame 54 to a central part 74 of the upper-end edge frame 32 of the side-surface part 3.

The third reinforcing member 9 may connect a connection part 75 between the rear side of the side-end edge frame 52 of the ceiling part 5 and the end part of the real lateral frame 55 to a connection part 76 between the rear side of the upper-end edge frame 32 of the side-surface part 3 and the upper end of the rear vertical frame 34. In this way, it is possible to connect the reinforcing members to the respective frames in a more closed manner (i.e., in a more densified manner) and thereby to improve the overall rigidity of the toilet room 11 even further.

Although the upper-end edge frame 32 of the side-surface part 3 and the side-end edge frame 52 of the ceiling part 5 are connected to each other by the three reinforcing members, i.e., by the first to third reinforcing members 7, 8, and 9, the connection method is not limited to this example method. The number of reinforcing members for connecting the upper-end edge frame 32 of the side-surface part 3 to the side-end edge frame 52 of the ceiling part 5 may be arbitrarily determined. For example, only one or two of the first to third reinforcing members 7, 8, and 9 may be provided, or a fourth reinforcing member may be provided in addition to the first to third reinforcing members 7, 8, and 9. As the number of reinforcing members is increased, the rigidity of the toilet room 11 increases according to the increase in number of reinforcing members.

Although the first to third reinforcing members 7, 8, and 9 are disposed on the front side, in the central part, and on the rear side, respectively, of the upper-end edge frame 32 of the side-surface part 3, the arrangement of the reinforcing members is not limited this example arrangement. Each of the first to third reinforcing members 7, 8, and 9 may be disposed at any place in the upper-end edge frame 32.

As described above, in the vehicle 1 with the toilet according to this embodiment, the side-surface part 3 includes the plate-like side-surface outer plate 31 extending in the vertical direction, and the upper-end edge frame 32 extending in the longitudinal direction and connected to the upper-end edge 311 of the side-surface outer plate 31. The ceiling part 5 includes the plate-like ceiling outer plate 51 extending in the horizontal direction, and the side-end edge frame 52 extending in the longitudinal direction and connected to the side-end edge 511 of the ceiling outer plate 51. The upper-end edge frame 32 of the side-surface part 3 and the side-end edge frame 52 of the ceiling part 5 are connected to each other by the rod-like first to third reinforcing members 7, 8, and 9.

In this way, by connecting the upper-end edge frame 32 to the side-end edge frame 52 and integrally forming the side-surface part 3 and the ceiling part 5, their rigidity is improved and hence the strength of the toilet room can be improved. Further, by forming the first to third reinforcing members 7, 8, and 9 by using only rod-like members, their weight can be reduced. That is, it is possible to achieve both the reduction in weight of the toilet room 11 and the improvement in strength thereof at the same time.

Several embodiments according to the present disclosure have been explained above. However, these embodiments are shown as examples but are not shown to limit the scope of the disclosure. These novel embodiments can be implemented in various forms. Further, their components/structures may be omitted, replaced, or modified without departing from the scope and spirit of the disclosure. These embodiments and their modifications are included in the scope and the spirit of the disclosure, and included in the scope equivalent to the invention specified in the claims.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A vehicle with a toilet comprising: a toilet room comprising a side-surface part and a ceiling part connected to the side-surface part, wherein
the side-surface part comprises a plate shaped side-surface outer plate extending in a vertical direction, and an upper-end edge frame extending in a longitudinal direction and connected to an inner-side upper-end edge of the side-surface outer plate,
the ceiling part comprises a plate shaped ceiling outer plate extending in a horizontal direction, and a side-end edge frame extending in the longitudinal direction and connected to an inner-side side-end edge of the ceiling outer plate, and
the upper-end edge frame of the side-surface part and the side-end edge frame of the ceiling part are connected to each other by at least one rod shaped reinforcing member.

2. The vehicle with the toilet according to claim 1, wherein at least one of the side-surface outer plate and the upper-end edge frame of the side-surface part, the ceiling outer plate and the side-end edge frame of the ceiling part, and the reinforcing member is formed of aluminum or a carbon fiber reinforced plastic.

3. The vehicle with the toilet according to claim 1, wherein
the ceiling part further comprises a lateral frame extending in a lateral direction, connected to an inner side of the ceiling outer plate, and connecting a side-end edge frame on a left side of the ceiling part to a side-end edge frame on a right side thereof,
the side-surface part further comprises a vertical frame extending from a lower end of the side-surface outer plate to the upper-end edge frame in the vertical direction, an upper end of the vertical frame being connected to the upper-end edge frame, and
the reinforcing member connects a connection part between the side-end edge frame and the lateral frame to a connection part between the upper-end edge frame and the vertical frame.

4. The vehicle with the toilet according to claim 1, wherein the at least one reinforcing member comprises:
a first reinforcing member connecting a front side of the upper-end edge frame of the side-surface part to a front side of the side-end edge frame of the ceiling part;
a second reinforcing member connecting a central part of the upper-end edge frame of the side-surface part to a central part of the side-end edge frame of the ceiling part; and
a third reinforcing member connecting a rear side of the upper-end edge frame of the side-surface part to a rear side of the side-end edge frame of the ceiling part.

5. The vehicle with the toilet according to claim 1, wherein an upper-end edge of the side-surface outer plate of the side-surface part and a side-end edge of the ceiling outer plate of the ceiling part are connected to each other by a curved-surface outer plate having a curved surface.

* * * * *